(12) United States Patent
Fujioka

(10) Patent No.: US 11,219,999 B2
(45) Date of Patent: Jan. 11, 2022

(54) ROBOT HAVING BASE WITH CONNECTOR UNIT

(71) Applicant: KABUSHIKI KAISHA YASKAWA DENKI, Kitakyushu (JP)

(72) Inventor: Hisashi Fujioka, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 48 days.

(21) Appl. No.: 16/681,852

(22) Filed: Nov. 13, 2019

(65) Prior Publication Data

US 2020/0156239 A1 May 21, 2020

(30) Foreign Application Priority Data

Nov. 16, 2018 (JP) .............................. JP2018-215253

(51) Int. Cl.
*B25J 9/00* (2006.01)
*B25J 19/00* (2006.01)

(52) U.S. Cl.
CPC .......... *B25J 9/0009* (2013.01); *B25J 19/0025* (2013.01); *B25J 19/0029* (2013.01)

(58) Field of Classification Search
CPC ... B25J 9/0009; B25J 19/0025; B25J 19/0029
USPC ...................................................... 74/490.02
See application file for complete search history.

(56) References Cited

U.S. PATENT DOCUMENTS

| | | | | |
|---|---|---|---|---|
| 4,378,959 A * | 4/1983 | Susnjara | ............. | B05B 13/0431 414/732 |
| 4,969,795 A * | 11/1990 | Toyoda | ................ | B25J 19/0025 414/744.2 |
| 5,437,207 A * | 8/1995 | Zimmer | ............... | B23K 11/318 414/918 |
| 5,651,519 A * | 7/1997 | Goodrich | ............. | B25J 19/0025 248/51 |
| 5,983,744 A * | 11/1999 | Watanabe | .................. | B25J 9/00 74/490.01 |
| 6,477,913 B1 * | 11/2002 | Akeel | .................. | B25J 19/0029 414/680 |

(Continued)

FOREIGN PATENT DOCUMENTS

| | | |
|---|---|---|
| CA | 2950973 A1 | 6/2017 |
| ES | 2674527 T3 | 7/2018 |

(Continued)

OTHER PUBLICATIONS

Japanese Office Action for corresponding JP Application No. 2018-215253, dated Aug. 18, 2020 (w/ English machine translation).

(Continued)

*Primary Examiner* — Joseph Brown
(74) *Attorney, Agent, or Firm* — Mori & Ward, LLP

(57) ABSTRACT

A robot includes a multi-articular arm and a base. The base includes a body and a connector unit. The body has a supporting surface and a space. The supporting surface supports a base end portion of the multi-articular arm. The space is provided in the body and has a base opening on the supporting surface. The connector unit is disposed in the space and includes a cable connector that is connectable to an internal cable disposed in the body and that has a connection opening to be connectable to an external cable. The connection opening faces toward the base opening.

11 Claims, 7 Drawing Sheets

(56) References Cited

U.S. PATENT DOCUMENTS

| | | | |
|---|---|---|---|
| 8,286,527 B2* | 10/2012 | Liu | B25J 19/0079 74/490.02 |
| 2003/0085681 A1* | 5/2003 | Sakamoto | B25J 9/042 318/568.16 |
| 2004/0261563 A1 | 12/2004 | Inoue et al. | |
| 2008/0156137 A1* | 7/2008 | Larsson | B25J 19/0075 74/490.02 |
| 2008/0260510 A1 | 10/2008 | Iwai et al. | |
| 2011/0314949 A1* | 12/2011 | Long | B25J 19/0029 74/490.04 |
| 2014/0137685 A1 | 5/2014 | Iwayama | |
| 2014/0142752 A1* | 5/2014 | Nogami | B25J 9/12 700/245 |
| 2014/0379129 A1* | 12/2014 | Edsinger | B25J 9/0096 700/254 |
| 2015/0027262 A1* | 1/2015 | Okahisa | B25J 18/00 74/490.02 |
| 2015/0114161 A1* | 4/2015 | Kawase | B25J 9/0009 74/490.01 |
| 2016/0297081 A1 | 6/2016 | Watanabe et al. | |
| 2017/0182669 A1* | 6/2017 | Bordegnoni | B25J 19/0029 |
| 2018/0001487 A1* | 1/2018 | Miyasaka | B25J 18/04 |
| 2018/0161991 A1 | 6/2018 | Hoshino et al. | |
| 2018/0221904 A1 | 8/2018 | Yoshino et al. | |
| 2018/0333844 A1* | 11/2018 | Inoue | B23K 9/12 |
| 2018/0370048 A1* | 12/2018 | Yoon | B25J 18/02 |
| 2019/0091852 A1* | 3/2019 | Yamazaki | B25J 9/0009 |
| 2019/0134810 A1* | 5/2019 | Goto | B25J 19/0029 |

FOREIGN PATENT DOCUMENTS

| | | |
|---|---|---|
| JP | 2005-014159 | 1/2005 |
| JP | 2014-100743 | 6/2014 |
| JP | 2018-27615 | 2/2018 |
| JP | 2018-126831 | 8/2018 |
| WO | WO 2006/120786 A1 | 11/2006 |

OTHER PUBLICATIONS

Korean Office Action for corresponding KR Application No. 10-2019-0133926, dated Nov. 23, 2020 (w/ English machine translation).
Extended European Search Report for corresponding EP Application No. 19208281.6, dated May 11, 2020.

* cited by examiner

ROBOT HAVING BASE WITH CONNECTOR UNIT

CROSS-REFERENCE TO RELATED APPLICATIONS

The present application claims priority under 35 U.S.C. § 119 to Japanese Patent Application No. 2018-215253, filed Nov. 16, 2018. The contents of this application are incorporated herein by reference in their entirety.

BACKGROUND

Field of the Invention

The embodiments disclosed herein relate to a robot.

Discussion of the Background

JP 2018-126831A discloses a robot that includes a multi-articular arm and a base. The base supports a base end portion of the multi-articular arm, and is fixed to an installation surface such as a floor surface. The base has a rectangular parallelepiped shape, having six surfaces. One surface of the six surfaces is the surface on which the multi-articular atm is supported, and the other five surfaces serve as installation surfaces so that the robots can be mounted on a floor and a wall.

Many conventional robots are connected with a large number of power feeding cables, in which case it is necessary to avoid interference between the cables and the multi-articular arms. For this purpose, it is common practice to incorporate the cables in the base.

SUMMARY

According to one aspect of the present disclosure, a robot includes a multi-articular arm and a base. The base includes a body and a connector unit. The body has a supporting surface and a space. The supporting surface supports a base end portion of the multi-articular arm. The space is provided in the body and has a base opening on the supporting surface. The connector unit is disposed in the space and includes a cable connector that is connectable to an internal cable disposed in the body and that has a connection opening to be connectable to an external cable. The connection opening faces toward the base opening.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

By referring to the accompanying drawings, a robot according to an embodiment will be described in detail below. It is noted that the following embodiment is provided for example purposes only and is not intended for limiting purposes. Also, while in the following description the robot will be described as being a "vertical multi-articular" robot having six axes, this is not intended as limiting the number of axes and axis configuration of the robot.

As used herein, the term "orthogonal" means, in a broad sense, exactly orthogonal or approximately orthogonal within some tolerance from exactly orthogonal. As used herein, the term "perpendicular" means, in a broad sense, exactly perpendicular or approximately perpendicular within some tolerance from exactly perpendicular. As used herein, the term "parallel" means, in a broad sense, exactly parallel or approximately parallel within some tolerance from exactly parallel. As used herein, the term "vertical" means, in a broad sense, exactly vertical or approximately vertical within some tolerance from exactly vertical. As used herein, the term "same" means, in a broad sense, exactly the same or approximately the same within some tolerance from exactly the same. As used herein, the term "identical" means, in a broad sense, exactly identical or approximately identical within some tolerance from exactly identical. As used herein, the term "equal" means, in a broad sense, exactly equal or approximately equal within some tolerance from exactly equal. Thus, these terms are used taking into consideration production-related, installation-related, processing-related, and detection-related tolerances and errors.

Figure 1:
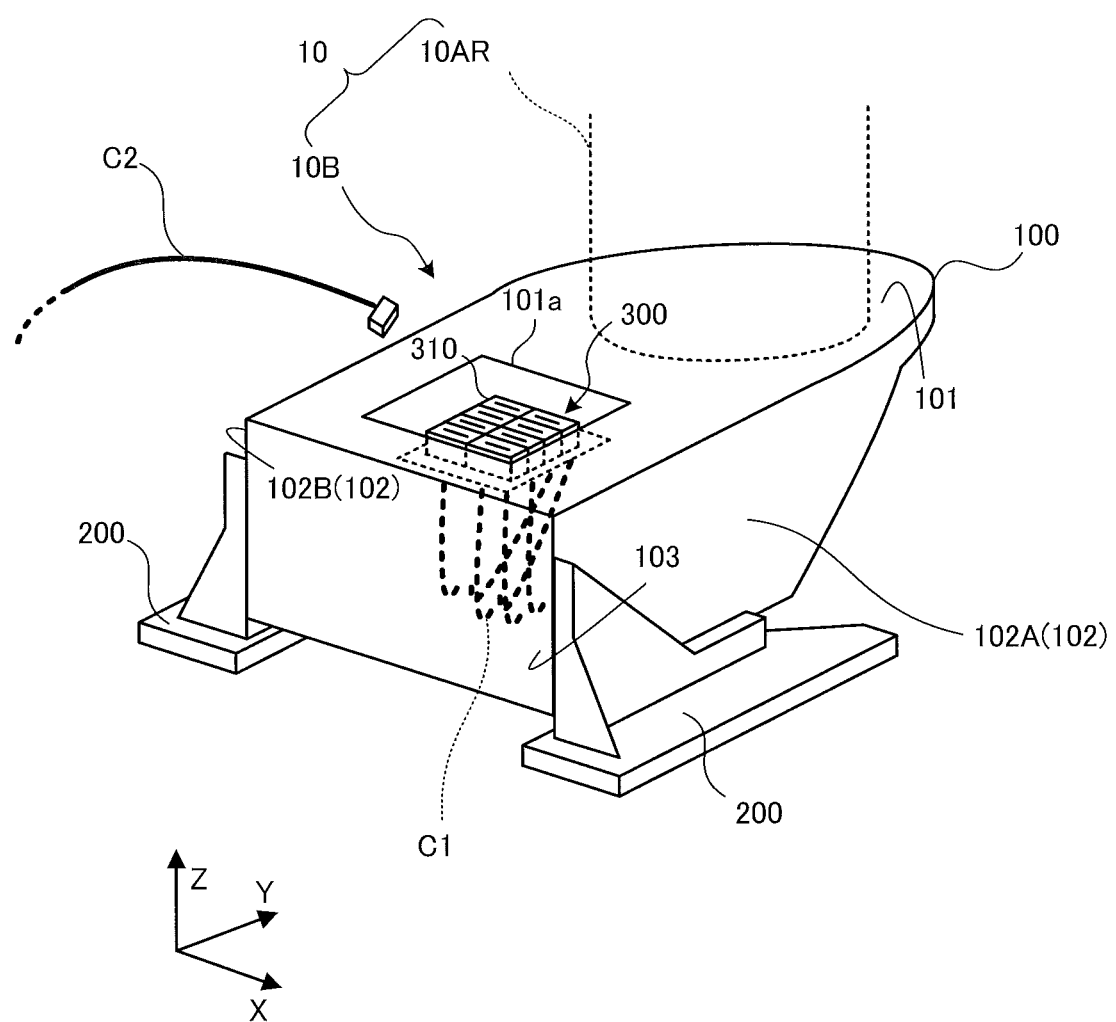
FIG. 1 illustrates an overview of a robot according to an embodiment.

A robot 10 according to this embodiment will be outlined by referring to FIG. 1. FIG. 1 illustrates an overview of the robot 10 according to this embodiment. It is to be noted that FIG. 1 illustrates in detail a configuration of a base 10B of the robot 10 and in less detail a multi-articular arm 10AR of the robot 10, with the existence of the multi-articular arm 10AR being indicated by broken lines and not being provided specific form. It is also to be noted that an example configuration of the robot 10 as a whole will be described later by referring to FIG. 7.

For ease of understanding of the following description, FIG. 1 is appended with a three-dimensional orthogonal coordinate system. In the coordinate system, the vertically upward direction corresponds to the positive direction of Z axis; the vertically downward direction corresponds to the negative direction of the Z axis; the direction toward the rear surface to the front surface of the base 10B corresponds to the negative direction of Y axis; the direction toward the front surface from the rear surface of the base 10B corresponds to the positive direction of the Y axis; the direction to the left side of the base 10B in FIG. 1 corresponds to the negative direction of X axis; and the direction to the right side of the base 10B in FIG. 1 corresponds to the positive direction of the X axis. In the following description, the negative direction of the X axis may occasionally be referred to as the "left side", and the positive direction of the X axis may occasionally be referred to as the "right side". The above-described orthogonal coordinate system may also be illustrated in some other drawings referred to in the following description.

As illustrated in FIG. 1, the base 10B of the robot 10 according to this embodiment includes a body 100 and a pair of brackets 200. The pair of brackets 200 are used for mounting the body 100 on an installation surface. It is to be noted that the pair of brackets 200 may be omitted when the body 100 is subjected to machining that makes the body 100 mountable directly on the installation surface.

The body 100 supports a base end portion of the multi-articular arm 10AR, and is fixed to an installation surface such as a floor surface and a ceiling surface via the pair of brackets 200. As used herein, the term "base end portion" of the multi-articular arm 10AR is intended to include the end of the multi-articular arm 10AR on the negative Z side and a portion offset from and proximate to the end of the multi-articular arm 10AR on the negative Z side. The pair of brackets 200 support respective side surfaces 102 (body side surfaces 102) of the body 100, and fix the body 100 to the installation surface.

In the body 100, the body 100 contains internal cables C1. Through the internal cables C1, power is supplied to actuators, sensors, and/or other electronic devices disposed in the robot 10. The internal cables C1 are connected to respective external cables C2 through a connector unit 300.

While in this embodiment the internal cables C1 and the external cables C2 are power feeding cables, the internal cables C1 and the external cables C2 may be communication cables through which electronic signals are transmitted or may be a mixture of power feeding cables and communication cables. In the following description, the internal cables C1 and the external cables C2 will occasionally be referred to collectively as "cable C" or "cables C". The cable C may be a single cable or a cable assembly covering a plurality of cables collectively.

As illustrated in FIG. 1, the body 100 has a supporting surface 101. The supporting surface 101 supports the multi-articular arm 10AR (in FIG. 1, the supporting surface 101 is the upper surface of the body 100). On the supporting surface 101, a base opening 101a is formed. The connector unit 300 is disposed in the body 100, and includes a plurality of cable connectors 310. Each of the cable connectors 310 has a connection opening for a corresponding external cable C2, and the connector unit 300 is fixed to the inside of the body 100 with each cable connector 310 taking such a posture that the connection opening faces the base opening 101a. The connection opening of each cable connector 310 is disposed at one end portion of the each cable connector 310. As used herein, the term "one end portion" of the each cable connector 310 is intended to include the end of the each cable connector 310 on the positive Z side and a portion offset from and proximate to the end of the each cable connector 310 on the positive Z side.

The cable connectors 310 are connected to the respective internal cables C1 on the other side of the cable connectors 310 (the side opposite to the base opening 101a), and to the respective external cables C2 through the base opening 101a. Thus, the external cables C2 and the internal cables C1 are electrically connected to each other. At a leading end portion of each external cable C2, the each external cable C2 is provided with a terminal adapted to the corresponding cable connector 310 so that the each external cable C2 is readily brought into connection with the corresponding cable connector 310. It is to be noted, however, that the terminal may be omitted.

While in FIG. 1 the plurality of cables connector 310 are arranged in a matrix in the connector unit 300, the number of the cable connectors 310 may be any other number more than one. Also, the cable connectors 310 may not necessarily be in a matrix arrangement but may be arranged in a line or randomly.

Thus, in the robot 10, the base opening 101a is disposed on the supporting surface 101 of the body 100, and the connection opening of the connector unit 300 faces the base opening 101a. This makes the connection work of the external cables C2 in the connector unit 300 more efficient.

It is to be noted that the robot 10 may have such a configuration that tubes such as pneumatic tubes in the body 100 do not interfere with the connection work of the external cables C2. This will be described in detail later by referring to FIG. 3. It is also to be noted that the robot 10 may include a cable duct that covers the base opening 101a and houses leading end portions of the external cables C2. This will be described in more detail later by referring to FIG. 4 and other drawings. As used herein, the term "leading end portion" of an external cable C2 is intended to include the leading end of the external cable C2 and a portion offset from and proximate to the leading end of the external cable C2.

Figure 2:
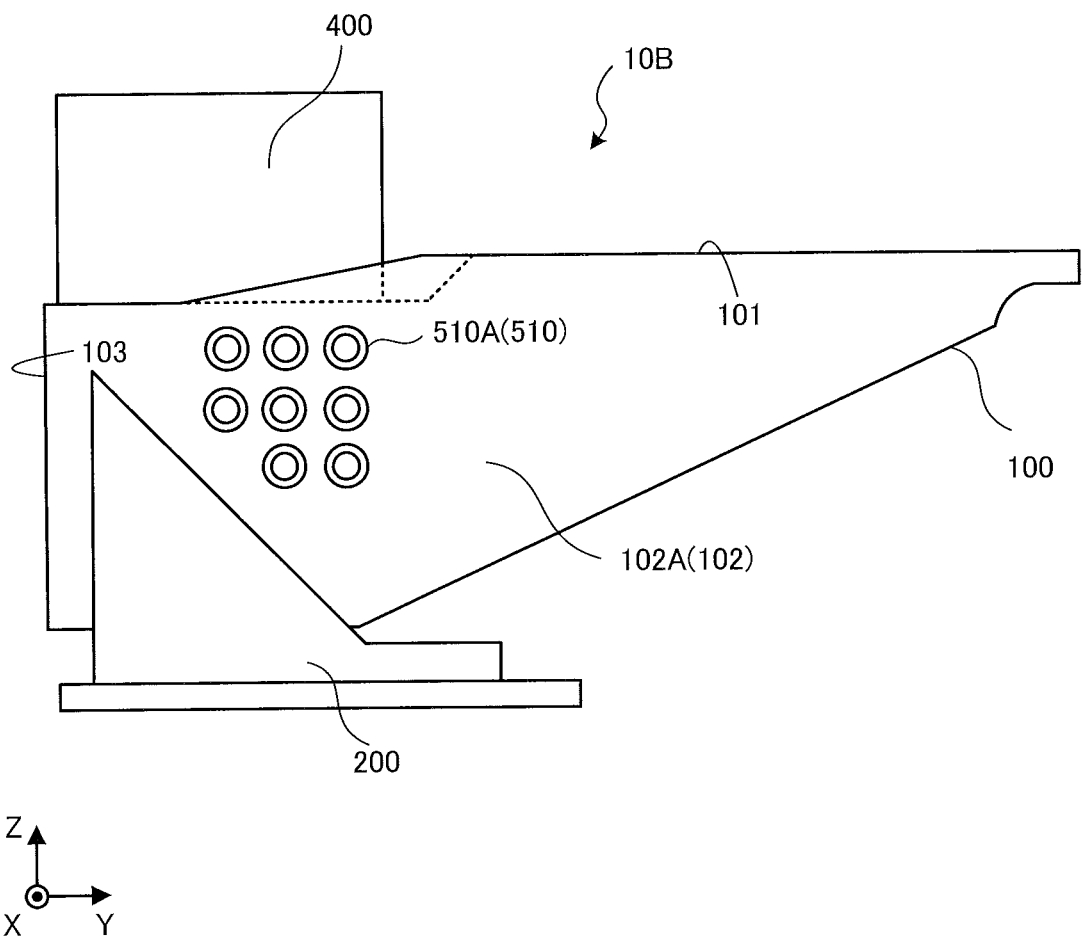
FIG. 2 is a side view of a base of the robot.

The base 10B illustrated in FIG. 1 will be described in more detail by referring to FIG. 2. FIG. 2 is a side view of the base 10B. Specifically, FIG. 2 is a view of the base 10B as seen from the positive X side. For ease of illustration, the multi-articular arm 10AR illustrated in FIG. 1 is omitted in FIG. 2.

As illustrated in FIG. 2, tube connectors 510 are disposed on each of the pair of body side surfaces 102. Specifically, the tube connectors 510 are disposed in a rear half area of each body side surface 102 that is closer to the rear surface 103. The tube connectors 510 are connectable to tubes T (see FIG. 3). Examples of the tubes T include, but are not limited to, pneumatic tubes. The tubes T include internal tubes T1 and external tubes T2. The internal tubes T1 are housed in the body 100, and the external tubes T2 are brought into connection with the body 100 from outside the body 100. The tubes T are for fluid such as gas and liquid to circulate in the robot 10.

It is to be noted that the body side surface 102 illustrated in FIG. 2 is a first body side surface 102A, which is the right-side body side surface 102, and that the tube connectors 510 disposed on the first body side surface 102A in FIG. 2 are first tube connectors 510A. While in FIG. 2 eight first tube connectors 510A are illustrated, the number of the first tube connectors 510A may be any other number more than one. It is to be noted that the left-side body side surface 102 will be described later by referring to FIG. 3.

Also as illustrated in FIG. 2, a cable duct 400 is mounted on the upper surface 101. The cable duct 400 covers the base opening 101a illustrated in FIG. 1 and houses the leading end portions of the external cables C2. The cable duct 400 is attachable and detachable to and from the upper surface 101. Similarly to the tube connectors 510, the cable duct 400 is disposed in a rear half area of the upper surface 101 that is closer to the rear surface 103.

Specifically, the cable duct 400 is disposed above the tube connectors 510. While in FIG. 2 the upper surface 101 has a lower step portion in the rear half area of the upper surface 101, the lower step portion may be omitted. The cable duct 400 will be described in more detail later by referring to FIG. 4 and other drawings.

Figure 3:
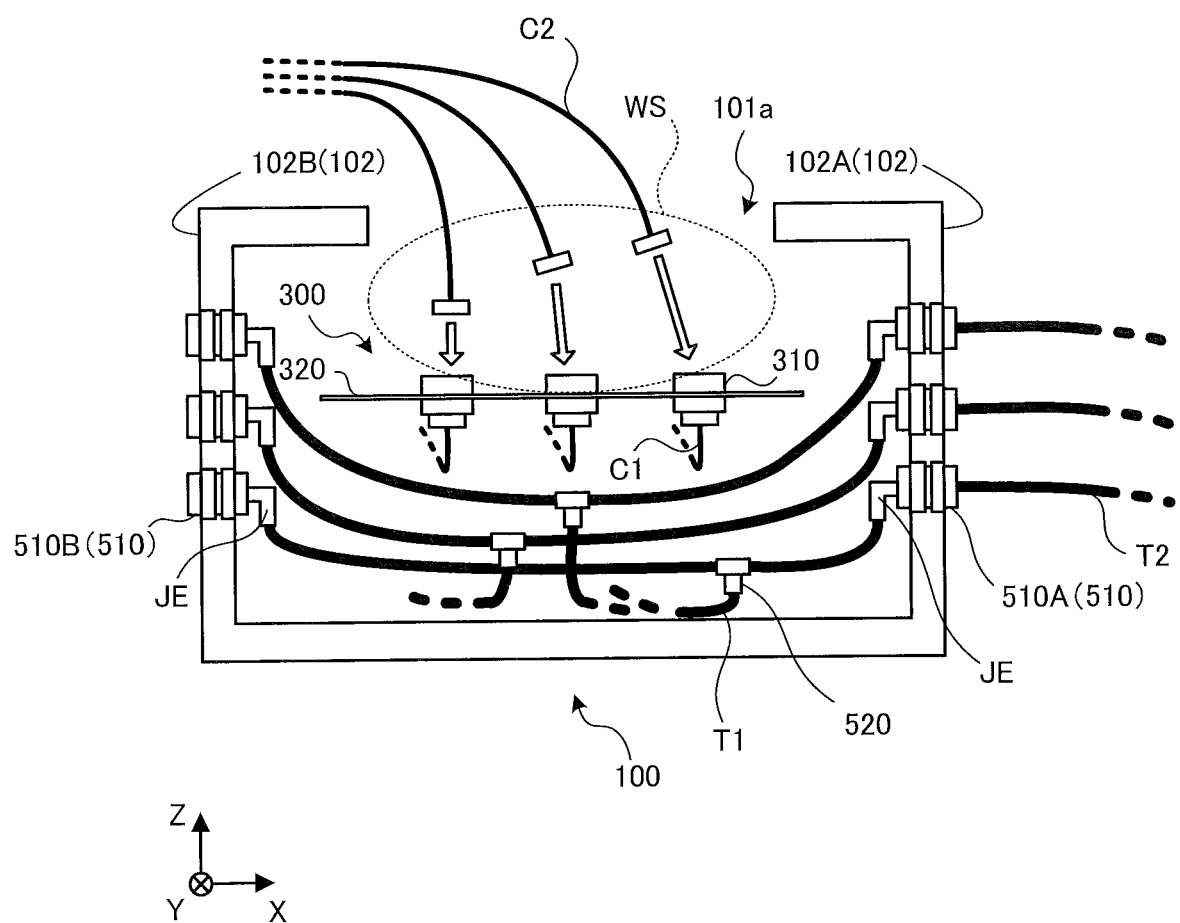
FIG. 3 is a schematic illustrating positions cables and tubes relative to each other in a body of the base.

By referring to FIG. 3, description will be made with regard to positions of the cables C and the tubes T relative to each other in the body 100. FIG. 3 is a schematic illustrating positions of the cables C and the tubes T relative to each other in the body 100. Specifically, FIG. 3 is a phantom view of the inside of the body 100 as seen from the rear surface 103 side (from the negative Y side), without hatching to indicate parts in cross section.

As illustrated in FIG. 3, the internal cables C1 and the internal tubes T1 are housed in the body 100. Below the base opening 101a, the connector unit 300 is fixed to an inner wall or another inner surface of the body 100. Below the connector unit 300, the internal tubes T1 are routed.

A workspace WS is defined between the connector unit 300 and the base opening 101a. In the workspace WS, the external cables C2 are connected to the cable connectors 310. This ensures that the connector unit 300 blocks access to the internal tubes T1 during the connection work of the external cables C2, eliminating or minimizing bending, damage, and/or other physical harm that are otherwise likely to occur on the internal tubes T1 during the connection work.

As illustrated in FIG. 3, the connector unit 300 includes the cable connectors 310 and a plate 320. The plate 320 partitions the internal space of the body 100 into an upper space and a lower space. The cable connectors 310 are supported by the plate 320 while taking such a posture that the connection openings for the external cables C2 face upward (face the base opening 101a). At another end portion of each cable connector 310, the each cable connector 310 is connected to a corresponding internal cable C1. As used herein, the term "another end portion" of the each cable connector 310 is intended to include the other end of the each cable connector 310 opposite to the one end of the each cable connector 310 in the Z directions and a portion offset from and proximate to the other end of the each cable connector 310 in the Z directions.

While in FIG. 3 the plate 320 has a planar shape, the plate 320 may have any other shape insofar as the plate 320 serves as a partition between the space for routing the internal tubes T1 and the workspace WS, which is the space for connecting the external cables C2. A possible example is that the ends of the plate 320 in the X directions are folded upward or downward. Another possible example is that a surrounding member defining the workspace WS above the plate 320 is provided on the upper surface of the plate 320.

Also as illustrated in FIG. 3, tube connectors 510 are disposed in an area of the first body side surface 102A, and other tube connectors 510 are disposed in an area of the second body side surface 102B. The tube connectors 510 on the first body side surface 102A are opposed to the respective tube connectors 510 on the second body side surface 102B. That is, the tube connectors 510 on the first body side surface 102A are the same in number as the tube connectors 510 on the second body side surface 102B. In the following description, the tube connectors 510 on the first body side surface 102A will be referred to as first tube connectors 510A, and the tube connectors 510 on the second body side surface 102B will be referred to as second tube connectors 510B.

Each of the internal tubes T1 branches at a branching connector 520 into a first internal tube connected to one first tube connector 510A and a second internal tube connected to one second tube connector 510B opposed to the one first tube connector 510A. As illustrated in FIG. 3, the branching connectors 520 are disposed below the connector unit 300.

The first internal tube and the second internal tube, which branch from the each internal tube T1, are each connected to one tube connector 510 via an elbow joint JE. The elbow joint JE is a joint of the type that the axis of the joint is bent into two joint portions, one joint portion being rotatable about the axis of the other joint portion. The elbow joint JE keeps the internal tube T1 bent downward, ensuring that the internal tube T1 is more reliably kept away from the workspace WS. It is to be noted that the bending angle of the elbow joint JE may be any angle; a non-limiting example of the bending angle is 90° (degrees).

Thus, each internal tube T1 branches into two internal tubes so that the each internal tube T1 is connected to both the first tube connector 510A on the first body side surface 102A and the second tube connector 510B on the second body side surface 102B. In other words, tube connectors 510 connected to the pre-branching internal tube T1 are disposed on both the opposed body side surfaces 102.

This ensures that the external tubes T2 can be collectively connected to one body side surface 102 of the opposed body side surfaces 102. For example, there may be an environment in which it is difficult to connect the external tubes T2 to the left-side body side surface 102 (the second body side surface 102B) of the body 100. In such environment, the external tubes T2 may be collectively connected to the respective first tube connectors 510A on the first body side surface 102A. Contrarily, there may be an environment in which it is difficult to connect the external tubes T2 to the right-side body side surface 102 (the second body side surface 102A) of the body 100. In such environment, the external tubes T2 may be collectively connected to the respective second tube connectors 510B on the second body side surface 102B. FIG. 3 illustrates the case where all the external tubes T2 are collectively connected to the first body side surface 102A.

It is to be noted that some of the external tubes T2 may be connected to the first tube connectors 510A, and the rest of the external tubes T2 may be connected to the second tube connectors 510B. It is also to be noted that when no external tube T2 is connected to either one of the pair of first tube connector 510A and second tube connector 510B, it is possible to cover the unconnected tube connector with a lid member.

While in FIG. 3 the uppermost tube connectors 510 are higher in position than the connector unit 300, all the tube connectors 510 may be lower in position than the plate 320 of the connector unit 300. This makes the internal tubes T1 more difficult to reach from the workspace WS.

Another possible example is that the tube connectors 510 are positioned as illustrated in FIG. 3, and the ends of the plate 320 on the first tube connector 510A side and the second tube connector 510B side are folded upward. This also makes the internal tubes T1 more difficult to reach from the workspace WS.

Figure 4:
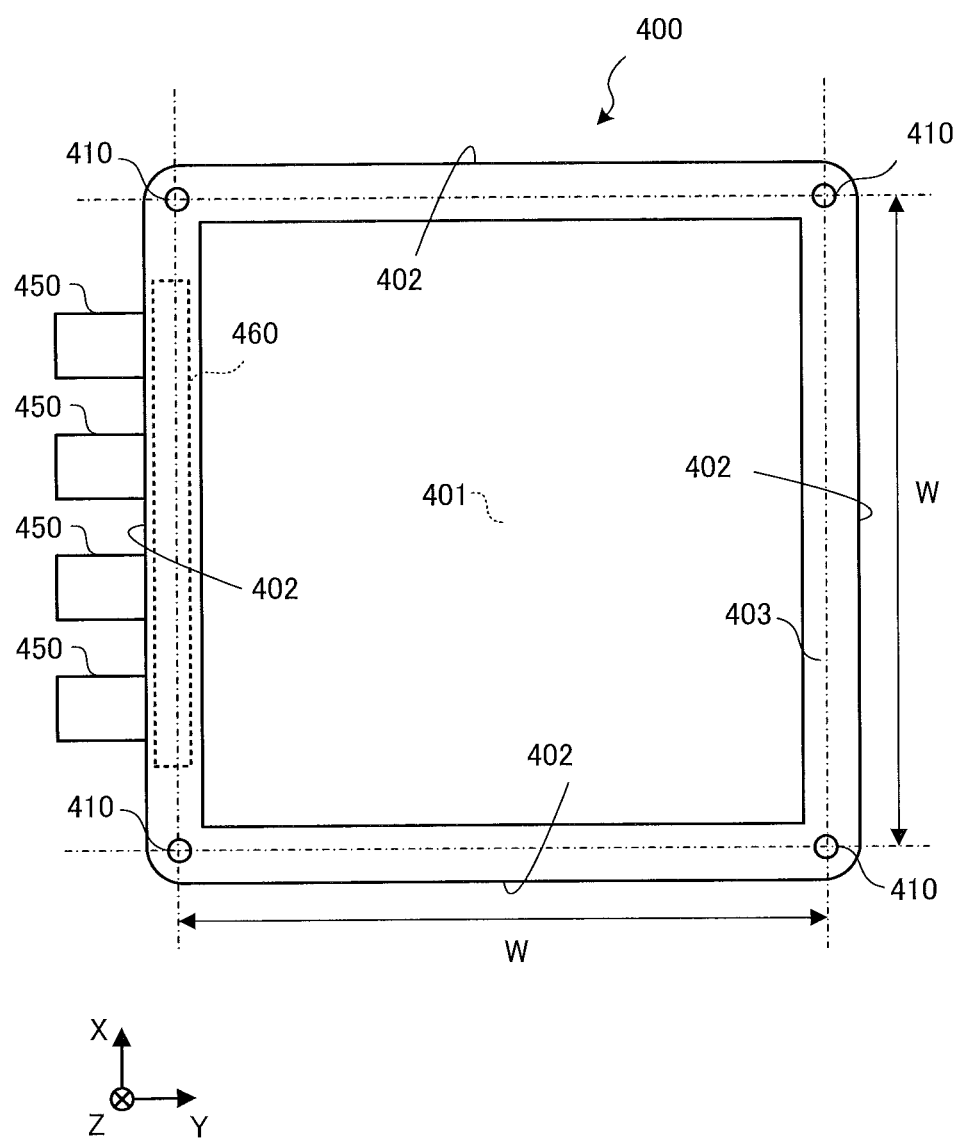
FIG. 4 is a bottom view of a cable duct.
Figure 5:
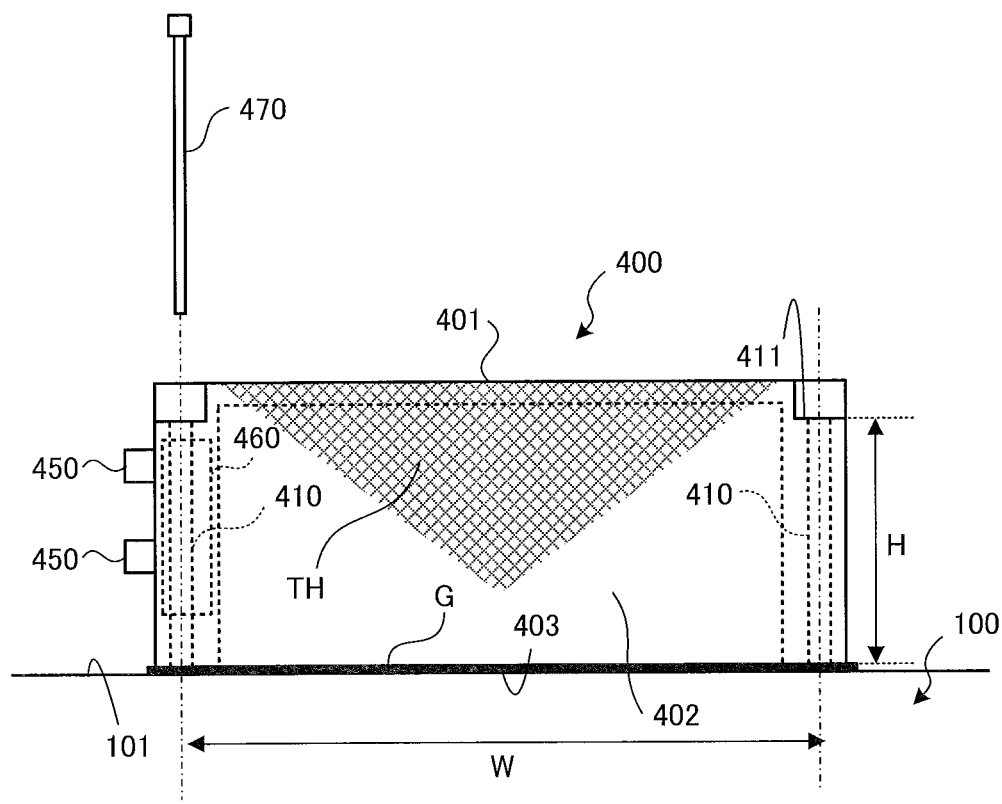
FIG. 5 is a side view of the cable duct.
Figure 5:
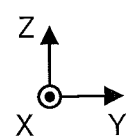

The cable duct 400 illustrated in FIG. 2 will be described in more detail below by referring to FIGS. 4 and 5. FIG. 4 is a bottom view of the cable duct 400, and FIG. 5 is a side view of the cable duct 400. The cable duct 400 illustrated in FIGS. 4 and 5 has a cubic shape having a closed top surface and an open bottom surface. FIG. 5 illustrates part of the upper surface (supporting surface) 101 of the body 100 illustrated in FIG. 1.

A configuration of the bottom of the cable duct 400 will be first described by referring to FIG. 4. As illustrated in FIG. 4, the cable duct 400 has a bottom surface 403. The bottom surface 403 has an opening connected to the base opening 101a and surrounds the base opening 101a illustrated in FIG. 1. The bottom surface 403 also has through holes 410. Each of the through holes 410 penetrates one of the four corner portions of the bottom surface 403. As used herein, the term "corner portion" of the bottom surface 403 is intended to include one corner of the bottom surface 403 and a portion offset from and proximate to the one corner of the bottom surface 403. The bottom surface 403 has a square outer shape. The distance (width) between every two adjoining through holes 410 is uniformly "W". The width W is defined between two parallel axis lines passing through two adjoining through holes 410.

The cable duct 400 also has the four side surfaces 402. One side surface 402 of the four side surfaces 402 has an opening in which a guide member 460 is disposed. The guide member 460 is an air tightness mechanism that includes cable grounds 450. The cable grounds 450 are connectable to the respective external cables C2 illustrated in FIG. 1. Thus, the opening on the one side surface 402 is covered by the guide member 460.

Each of the cable grounds 450 is divided into two on, for example, a plane along the axis of the corresponding external cable C2 (see FIG. 3), ensuring that the external cable C2 may have any excess length on the side of its leading end portion. The cable grounds 450 are mounted on the one side surface 402 of the cable duct 400 with the guide member 460 making the cable duct 400 air-tight.

As described above, the axis-to-axis width between two adjoining through holes 410 is uniform. This uniformness makes the facing direction of the guide member 460 readily adjustable. While in FIG. 4 the guide member 460 faces in the negative Y direction, the guide member 460 may face in the positive Y direction, the positive X direction, or the negative X direction. In any of these directions, the facing direction of the guide member 460, that is, the direction in which the external cables C2 are guided out of the cable duct 400 is readily adjustable without the need for additional machining or processing.

A configuration of a side surface of the cable duct 400 will be described by referring to FIG. 5. As illustrated in FIG. 5, each of the side surfaces 402 of the cable duct 400 has such a rectangular shape that the height is smaller than the width. Between the cable duct 400 and the upper surface 101 of the body 100, a gasket G is disposed. The gasket G has an identical shape to the shape of the bottom surface 403 illustrated in FIG. 4. Use of the gasket G makes the body 100 and the cable duct 400 more air-tight.

Also, a through hole 410 (which is illustrated in FIG. 4 as well) is formed in each side edge portion of each side surface 402. As used herein, the term "side edge portion" of each side surface 402 is intended to include one edge of the side surface 402 in the Y directions and a portion offset from and proximate to the one edge of the side surface 402 in the Y directions. A boss 470 penetrates each through hole 410 and thus fixes the cable duct 400 to the upper surface 101 of the body 100. The boss 470 includes a shaft and a head. The shaft has an outer diameter smaller than the inner diameter of the through hole 410. The head has an outer diameter larger than the outer diameter of the shaft. The shaft has screw grooves formed on a leading end portion of the shaft. As used herein, the term "leading end portion" of the shaft is intended to include the end of the shaft on the side on which the shaft is engaged with the body 100 and a portion offset from and proximate to the end of the shaft on the side on which the shaft is engaged with the body 100.

A counterbore 411 is formed at an upper end portion of each through hole 410. As used herein, the term "upper end portion" of each through hole 410 is intended to include the end of the each through hole 410 on the positive Z side and a portion offset from and proximate to the end of the each through hole 410 on the positive Z side. The counterbore 411 is for the head of the boss 470 to rest in so that the head of the boss 470 is kept from protruding beyond the upper surface, 401, of the cable duct 400. This eliminates or minimizes occurrence of such a situation that an obstacle or some other object gets caught on the cable duct 400. It is to be noted that the counterbore 411 may be omitted.

The axis-to-axis width between two adjoining through holes 410 is "W", and the height of each through hole 410 is "H". The axis-to-axis width W and the height H of each through hole 410 are in a relationship represented by "W≤H×2". Thus, the axis-to-axis width (distance) W is equal to or less than twice the height H of each through hole 410.

By making the axis-to-axis width equal to or less than twice the height of each through hole 410, the pressing force of the head of the boss 470 is distributed approximately uniformly over the bottom surface 403, when the cable duct 400 is mounted on the upper surface 101. This is because the pressing force of the head of the boss 470 is transmitted in conical form having an approximately 45-degree bevel in the cable duct 400.

More specifically, the pressing force of a single boss 470 is transmitted, as far as the width direction is concerned, in the range of H, which is the height of each through hole 410. Therefore, by making the axis-to-axis width equal to or less than twice "H", the pressing force is transmitted throughout the width. It is to be noted that considering that the pressing force starts at the outer circumference of the head, the range over which the pressing force is transmitted can be enlarged by, for example, increasing the outer diameter of the head and/or using a washer greater in outer diameter than the head.

The height of the counterbore 411 is generally small relative to the height of the cable duct 400. In light of this, it is possible to regard the height of each side surface 402 as H, which is the height of each through hole 410. Also, the through hole 410 is formed in each side edge portion of each side surface 402. In light of this, it is possible to regard the width of each side surface 402 as W, which is the axis-to-axis width between two adjoining through holes 410. That is, the width of each side surface 402 may be equal to or less than twice the height of each side surface 402.

As illustrated in FIG. 5, a thin portion TH may be disposed on a side surface 402 of the cable duct 400. The thin portion TH has an inverse triangle shape such that the width of the thin portion TH gradually diminishes from the upper surface 401 toward the bottom surface 403. The thin portion TH is disposed in an area where the pressing force of the boss 470 is less influential (that is, an area not included in the above-described conical form). This makes the pressing force transmitted more reliably, facilitating the attempt to make the cable duct 400 lighter in weight. The thin portion TH may be disposed on a side surface 402 other than the one side surface 402 on which the guide member 460 is disposed.

Figure 6:
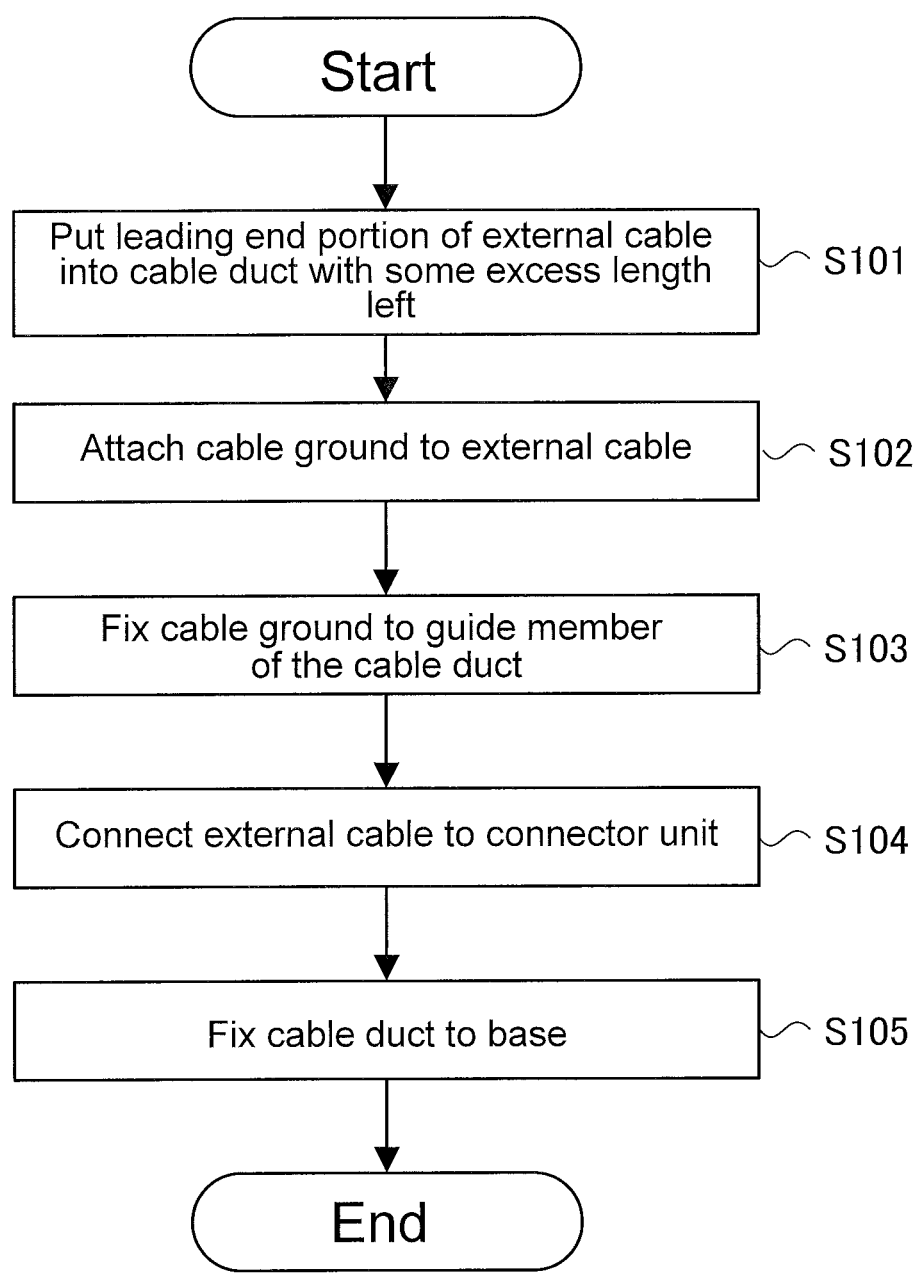
FIG. 6 is a flowchart of a procedure for connecting a cable.

By referring to FIG. 6, description will be made with regard to a procedure for connecting a cable C through the cable duct 400. FIG. 6 is a flowchart of a procedure for connecting a cable C. Referring to FIG. 6, the leading end portion of an external cable C2 is passed through the guide member 460 and is put into the cable duct 400 with some excess length left for connection purposes (step S101).

The cable duct 400 has a rectangular parallelepiped internal space. This ensures that after the external cable C2 has been bent at a plurality of portions, there is still a sufficient excess length left for connection purposes. This work of putting the leading end portion of an external cable C2 into the cable duct 400 is more readily performed with the cable duct 400 turned upside down, so that the bottom surface 403 of the cable duct 400 faces upward.

Next, a cable ground 450 is attached to the external cable C2 (step S102). The cable ground 450 is freely slidable along the external cable C2. It is to be noted that step S102 may be performed before step S101.

Next, the cable ground 450 is fixed to the guide member 460 of the cable duct 400 (step S103). By fixing the cable ground 450 to the guide member 460, the external cable C2 and the cable duct 400 are kept air-tight.

Then, the external cable C2 is brought into connection with the connector unit 300 (step S104). It is to be noted that step S104 may be performed immediately after step S101 or immediately after step S102.

Next, the facing direction of the guide member 460 of the cable duct 400 is set at one of the above-described four directions, and the cable duct 400 is fixed to the base 10B (step S105). It is to be noted that the internal cables C1 are connected in advance to the connector unit 300 and that upon completion of step S105, the work of electrically connecting the external cable C2 and a corresponding internal cable C1 to each other is completed.

Also upon completion of step S105, the cable duct 400 and the portion of the body 100 around the base opening 101a are kept air-tight, isolating the inside of the body 100 from the outside of the robot 10. This ensures that even if the robot 10 is used in an explosive atmosphere, the inside of the robot 10 is isolated from the explosive atmosphere.

As has been described above by referring to FIG. 6, the robot 10 according to this embodiment is provided with the base 10B. This makes the connection work of the cables C more readily performable in the robot 10. This, in turn, saves the labor of installing the robot 10 on-site, resulting in shortened working time.

Also in the robot 10 with the base 10B, the base opening 101a, through which the external cables C2 are introduced, is provided at one position on the base 10B, and the connection direction of the external cables C2 is adjustable by changing the orientation in which the cable duct 400 is mounted on the base 10B. Thus, it is not necessary to provide the base opening 101a at a plurality of positions because the connection direction of the external cables C2 is variable. This reduces the production cost of the robot 10.

Figure 7:
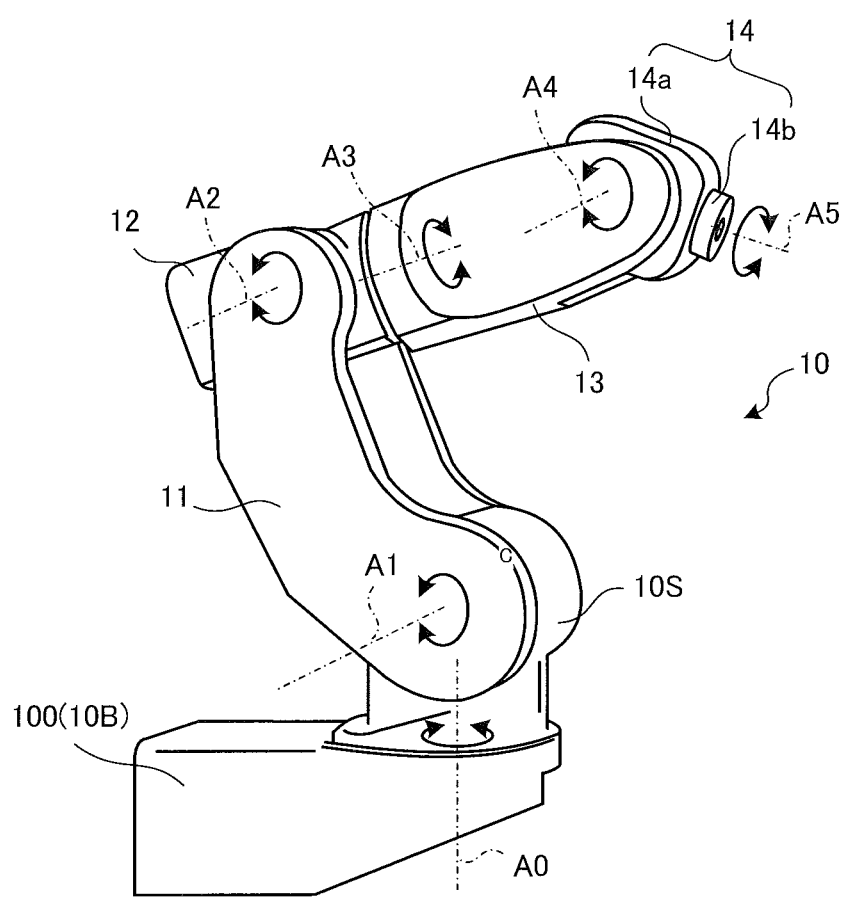
FIG. 7 is a perspective view of the robot.

An example of the robot 10 provided with the base 10B will be described by referring to FIG. 7. FIG. 7 is a perspective view of the robot 10. As illustrated in FIG. 7, the robot 10 is a "vertical multi-articular robot" having six axes, namely, turning axis A0, first axis A1, second axis A2, third axis A3, fourth axis A4, and fifth axis A5. Since the robot 10 is a six-axis robot, the robot 10 has three degrees of freedom about the position of a leading end portion of the robot 10, and has three degrees of freedom about the orientation of the leading end portion of the robot 10. As used herein, the term "leading end portion" of the robot 10 is intended to include the leading end of the robot 10 and a portion offset from and proximate to the leading end of the robot 10. That is, the leading end portion of the robot 10 is adjustable to any three-dimensional position and in any three-dimensional orientation.

As illustrated in FIG. 7, the robot 10 includes (in increasing order of distance from the base) the base 10B, which is illustrated in FIG. 1 and other drawings, a turnable member 10S, a first arm 11, a second arm 12, a third arm 13, and a wrist 14. It is to be noted that the pair of brackets 200 of the base 10B is omitted, with the body 100 illustrated. The turnable member 10S, the first arm 11, the second atm 12, the third arm 13, and the wrist 14 correspond to the multi-articular arm 10AR illustrated in FIG. 1. Any working tool is attachable and detachable to and from a leading end portion of the wrist 14. As used herein, the term "leading end portion" of the wrist 14 is intended to include the end of the wrist 14 at which a working tool is attached and a portion offset from and proximate to the end of the wrist 14 at which a working tool is attached.

As used herein, the term "arm" is intended to include the wrist 14 and the turnable member 10S, as well as the first arm 11, the second arm 12, and the third arm 13. That is, any movable member of the robot 10 that is capable of making rotational, turning, or swinging movement is referred to as "arm".

The base 10B has already been detailed above by referring to FIG. 1 and other drawings and will not be elaborated upon here. The turnable member 10S is supported by the base 10B and is turnable about the turning axis A0, which extends vertically. The first arm 11, at its base end portion, is supported by the turnable member 10S and is turnable about the first axis A1, which is perpendicular to the turning axis A0. The second arm 12, at its base end portion, is supported by a leading end portion of the first arm 11, and is turnable about the second axis A2, which is parallel to the first axis A1.

The third arm 13, at its base end portion, is supported by a leading end portion of the second arm 12, and is turnable about the third axis A3, which is perpendicular to the second axis A2. The wrist 14 includes a turnable member 14a and a rotatable member 14b. The turnable member 14a, at its base end portion, is supported by a leading end portion of the third arm 13, and is turnable about the fourth axis A4, which is perpendicular to the third axis A3.

The rotatable member 14b, at its base end portion, is supported by a leading end portion of the turnable member 14a, and is rotatable about the fifth axis A5, which is orthogonal to the fourth axis A4. The above-described working tool is attachable and detachable to and from a leading end portion of the rotatable member 14b. It is to be noted that the turnable member 14a and the rotatable member 14b are hollow on the inside so that cables and tubes connected to the working tool are passed through the hollow portions of these members. This eliminates the need for routing cables and/or wires on and around the wrist 14, resulting in improved workability of the robot 10.

It is to be noted that the robot 10 illustrated in FIG. 7 is provided for exemplary purposes only, and the base 10B illustrated in FIG. 1 and other drawings is applicable to any other multi-articular arms axis of any axis number and axis configuration.

As has been described hereinbefore, the robot 10 according to this embodiment includes the multi-articular arm 10AR and the base 10B. The base 10B supports the base end portion of the multi-articular arm 10AR. The base 10B includes the body 100 and the connector unit 300. The body 100 has the supporting surface 101 and the base opening 101a. The supporting surface 101 supports the multi-articular arm 10AR. The base opening 101a is disposed on the supporting surface 101.

The connector unit 300 includes the cable connectors 310. The cable connectors 310 are connected to the respective internal cables C1, which are disposed in the body 100. Each of the cable connectors 310 has an connection opening for a corresponding external cable C2. The connection opening is disposed in the body 100 and faces the base opening 101a. The body 100 also includes the tube connectors 510 on the opposed body side surfaces 102. The tube connectors 510 connect the internal tubes T1, which are disposed in the body 100, to the external tubes T2.

Thus, in the robot 10, the base opening 101a is disposed on the supporting surface 101 of the body 100, and the connection opening of the connector unit 300 faces the base opening 101a. This makes the connection work of the external cables C2 in the connector unit 300 more efficient. This, in turn, makes the connection work in the robot 10 more efficient.

While in this embodiment the base opening on the body has a rectangular shape and the cable duct covering the base opening has a square bottom, the base opening may have a circular shape and the bottom of the cable duct may have a circular shape as well. In this case as well, the direction in which the external cables are guided out of the cable duct is freely adjustable. The side surfaces of the cable duct may have hemisphere shapes such as dome shapes.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot comprising:
   a multi-articular arm; and
   a base comprising:
      a body comprising:
         a supporting surface directly supporting a base end portion of the multi-articular arm;
         a space provided in the body and having a base opening on the supporting surface;
         a first tube connector which is disposed on a first body side surface of the body and through which an internal tube disposed in the body is connectable to a first external tube; and
         a second tube connector which is disposed on a second body side surface of the body opposed to the first body side surface and through which the internal tube is connectable to a second external tube; and
         a connector unit disposed in the space and comprising a cable connector that is connectable to an internal cable disposed in the body and that has a connection opening to be connectable to an external cable, the connection opening facing toward the base opening,
      wherein the body comprises a branching connector at which the internal tube branches from a pre-branching internal tube into a first internal tube connected to the first tube connector and a second internal tube connected to the second tube connector.

2. The robot according to claim 1, wherein the branching connector is disposed below the connector unit.

3. The robot according to claim 2, further comprising an attachable and detachable cable duct covering the base opening of the supporting surface and housing a leading end portion of the external cable connected to the connection opening of the cable connector.

4. The robot according to claim 3, wherein the cable duct has a square shape as viewed from the base opening of the supporting surface and has a cubic shape having a closed surface and an open surface facing the base opening.

5. The robot according to claim 4, wherein the cable duct has four side surfaces, at least one side surface of the four side surfaces having a guide member through which the external cable is guided out of the cable duct.

6. The robot according to claim 1, further comprising:
   an attachable and detachable cable duct covering the base opening of the supporting surface and housing a leading end portion of the external cable connected to the connection opening of the cable connector.

7. The robot according to claim 6, wherein the cable duct has a square shape as viewed from the base opening of the supporting surface and has a cubic shape having a closed surface and an open surface facing the base opening.

8. The robot according to claim 7, wherein the cable duct has four side surfaces, at least one side surface of the four side surfaces having a guide member through which the external cable is guided out of the cable duct.

9. The robot according to claim 8,
   wherein the cable duct has four corner portions and four through holes penetrating the respective four corner portions as viewed from the base opening of the supporting surface, and
   wherein each side surface of the four side surfaces of the cable duct has a width defined by axis lines passing through adjoining through holes of the four through holes, the width being equal to or less than twice a height of each through hole of the four through holes.

10. The robot according to claim 1, further comprising:
    an attachable and detachable cable duct covering the base opening of the supporting surface and housing a leading end portion of the external cable connected to the connection opening of the cable connector,
    wherein the cable duct has four side surfaces, at least one side surface of the four side surfaces having a guide member through which the external cable is guided out of the cable duct, the at least one side surface facing perpendicular to the base opening.

11. A robot comprising:
    a multi-articular arm; and
    a base comprising:
       a body comprising:
          a supporting surface supporting a base end portion of the multi-articular arm;
          a space provided in the body and having a base opening on the supporting surface;
          a first tube connector which is disposed on a first body side surface of the body and through which an internal tube disposed in the body is connectable to a first external tube; and
          a second tube connector which is disposed on a second body side surface of the body opposed to the first body side surface and through which the internal tube is connectable to a second external tube; and
          a connector unit disposed in the space and comprising a cable connector that is connectable to an internal cable disposed in the body and that has a connection opening to be connectable to an external cable, the connection opening facing toward the base opening,
       wherein the internal cable includes a power feeding cable,
       wherein the body comprises a branching connector at which the internal tube branches from a pre-branching internal tube into a first internal tube connected to the first tube connector and a second internal tube connected to the second tube connector.

* * * * *